UNITED STATES PATENT OFFICE.

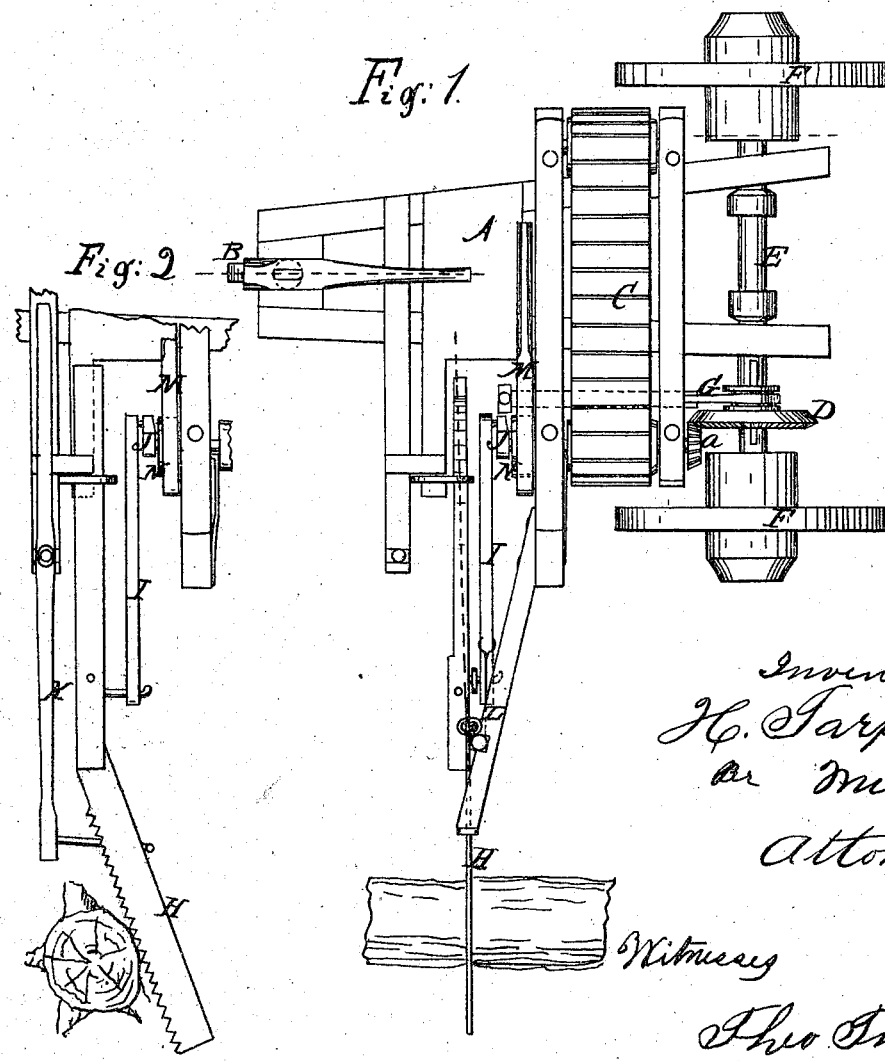

HENRY TARPLEY, OF WESLEY, KENTUCKY.

IMPROVEMENT IN HORSE-POWERS.

Specification forming part of Letters Patent No. 75,597, dated March 17, 1868.

*To all whom it may concern:*

Be it known that I, HENRY TARPLEY, of Wesley, in the county of Hickman and State of Kentucky, have invented a new and useful Improvement in Horse-Power Sawing-Machines; and I do hereby declare that the following is a full, clear, and exact description thereof, which will enable those skilled in the art to make and use the same, reference being had to the accompanying plate of drawings, forming part of this specification.

This invention relates to a new and useful improvement in that class of sawing-machines which are used principally for sawing down standing trees, and sawing logs into cord-wood, and which are driven by horse-power.

My invention consists in combining a horse-power with the sawing-machine in such a manner that a horse can be made to propel the machine from place to place, when required, and, when the machine is at the desired spot for work, the horse made to drive the saw.

In the accompanying sheet of drawings, Figure 1 is a plan or top view of my invention; Fig. 2, a plan or top view of a portion of the same, showing a different portion of the saw; Fig. 3, a vertical section of a part of the machine, taken in the line $x$ $x$, Fig. 1; Fig. 4, a vertical section of a portion of the same, taken in the line $y$ $y$, Fig. 1.

Similar letters of reference indicate corresponding parts.

A represents a three-wheeled cart, the front wheel B being arranged on the caster principle, to admit of the cart being steered or guided as it is propelled along. On this cart there is placed an endless-platform horse-power, C, which may be constructed in the usual way. The front roller of the endless platform has a bevel-pinion, $a$, on one of its journals, and this pinion, at certain times, is made to gear into a large bevel-wheel, D, placed on the axle E of the two wheels F F, which support the rear part of the machine. The wheel D is connected with the axle by a feather and groove, so that it may slide thereon, and be adjusted in gear with the pinion $a$, or moved out of gear therefrom, the wheel D being thus moved by means of a lever, G. The wheels F F are fitted loosely on the axle E, and on each hub, at its inner part, there is a ratchet, $b$, with which pawls $c$ on the axle E engage when the axle is rotated in the direction indicated by arrow 1, and the wheels F F are thereby made to rotate in the same direction, and the machine propelled along by the horse on the endless platform C, the wheel D, of course, being thrown in gear with the pinion $a$ when the machine is to be propelled by the horse.

When the machine arrives at the place where it is to be used, the wheel D is thrown out of gear from the pinion $a$, and the horse-power consequently disconnected from the axle E, so that the machine will remain stationary when the horse-power is in operation; and the horse-power then operates a reciprocating saw, H, through the medium of a pitman, I, and a crank, J, which is attached to the journal of the front roller of the endless platform C, opposite to the one which has the pinion $a$ upon it. The saw H may be adjusted so as to cut either in a vertical or in a horizontal plane, the vertical cut being shown in Fig. 1, and the horizontal cut in Fig. 2. In cutting horizontally, which is done in felling trees, the saw is adjusted to its work or fed laterally by a lever, K; and in cutting vertically, as in sawing cord-wood, the saw is raised at the completion of each cut by a cord, L, the saw feeding itself to its work by its own gravity. The speed of the saw may be checked at any time by a brake, consisting of a lever, M, and a pulley, N, the latter being fitted on the same journal of the front roller of the endless platform as the crank J, the lever M being pressed on the pulley N by hand. When the machine is being propelled along by the horse-power, the crank J is detached from its journal, so that no motion will be given the saw H.

Having thus described my invention, I claim as new and desire to secure by Letters Patent—

The combination of the endless-platform horse-power C with the cart A and the reciprocating saw H, all arranged in such a manner that the horse-power may be rendered available for propelling the machine along from place to place, and also for driving the saw, as set forth.

The above specification of my invention signed by me this 14th day of October, 1867.

HENRY TARPLEY.

Witnesses:
    J. H. WOOSLEY,
    FINLEY HUSS.